United States Patent
Brearley

[19]

[11] Patent Number: 6,082,835
[45] Date of Patent: Jul. 4, 2000

[54] DIFFERENTIAL BRAKING CONTROL IN ROAD VEHICLES

[75] Inventor: Malcolm Brearley, West Midlands, United Kingdom

[73] Assignee: Lucas Industries Public Limited Company, Solihull, United Kingdom

[21] Appl. No.: 08/930,593

[22] PCT Filed: Mar. 5, 1996

[86] PCT No.: PCT/GB96/00498

§ 371 Date: Dec. 29, 1997

§ 102(e) Date: Dec. 29, 1997

[87] PCT Pub. No.: WO96/32310

PCT Pub. Date: Oct. 17, 1996

[30] Foreign Application Priority Data

Apr. 8, 1995 [GB] United Kingdom .................... 9507368

[51] Int. Cl.[7] ...................................................... B60T 8/66
[52] U.S. Cl. .......................... 303/169; 303/112; 303/186; 303/DIG. 6
[58] Field of Search .................... 303/3, 15, 127, 303/149, 169, 186, 191, 198, DIG. 6, 167, 168, 187, 188, 189, 112, 160, 166

[56] References Cited

U.S. PATENT DOCUMENTS

| | | | |
|---|---|---|---|
| 3,706,351 | 12/1972 | Neisch | 303/169 |
| 3,744,854 | 7/1973 | Ooya et al. | 303/115.3 |
| 3,771,840 | 11/1973 | Hubbard | 303/176 |
| 3,804,999 | 4/1974 | Hubbard | 303/176 |
| 4,566,737 | 1/1986 | Masaki et al. | 303/173 |
| 4,685,745 | 8/1987 | Reinecke | 303/191 |
| 4,712,839 | 12/1987 | Brearley et al. | 303/3 |
| 5,004,299 | 4/1991 | Brearley et al. | 303/15 |
| 5,004,300 | 4/1991 | Brearley et al. | 303/15 |
| 5,011,236 | 4/1991 | Toepfer et al. | 303/198 |
| 5,042,883 | 8/1991 | McCann et al. | 303/7 |
| 5,080,445 | 1/1992 | Brearley et al. | 303/7 |
| 5,088,042 | 2/1992 | Brearley et al. | 364/426.01 |
| 5,328,251 | 7/1994 | Brearley | 303/9 |
| 5,333,940 | 8/1994 | Topfer | 303/15 |
| 5,362,139 | 11/1994 | Watanabe | 303/186 |
| 5,404,302 | 4/1995 | Matsuda et al. | 303/169 |
| 5,407,258 | 4/1995 | Giers et al. | 303/169 |
| 5,407,259 | 4/1995 | Itabashi et al. | 303/169 |
| 5,575,543 | 11/1996 | Pheonix | 303/155 |
| 5,992,579 | 11/1999 | Kyrtsos | 188/79.52 |

Primary Examiner—Robert J. Oberleitner
Assistant Examiner—Thomas J. Williams
Attorney, Agent, or Firm—Oblon, Spivak, McClelland, Maier & Neustadt, P.C.

[57] ABSTRACT

An electronic braking system which recognizes differential braking across an axle. A stored adaptive capability is provided whereby a braking controller is able to learn the braking imbalance and correct for this by introducing differential pressure adjustments such as increasing braking at the wheel of the lower brake output and/or reducing braking at the wheel with a higher brake output. The learning process is completed over selected parts of several vehicle stops and is repeated continuously.

20 Claims, 5 Drawing Sheets

DIFFERENTIAL BRAKING CONTROL IN ROAD VEHICLES

BACKGROUND OF THE INVENTION

The present invention is concerned with electronic braking systems in road vehicles and in particular with an electronic braking system which can recognise and respond to differential braking across an axle.

DISCUSSION OF THE BACKGROUND

In conventional vehicle braking systems, braking force imbalance across an axle of the vehicle can occur from a number of sources of which the primary cause is the differential friction coefficient between the fixed lining and the rotary parts of the brakes resulting from material and working condition variations. Brake actuation components are subject to tolerance and friction variations which affect braking input forces. Physical differences between one brake adjuster and another cause modification of input displacements which have a similar effect. Actuating pressures are generally equal on most pneumatic systems in which the same circuit communicates with both brakes. However, with electronic braking systems, axle wheel pressures can be different to some extent due to component tolerances, because the brakes have actuating pressures which are individually controlled. Our European Patent No. 0386953 describes a system in which the two brakes are linked together by a specially provided pipe which restores the pressure equality in the event of primary imbalance. Such a means provides pressure balance in the two braking circuits but does not seek to address the possible brake force imbalance which may be present nevertheless.

U.S. Pat. No. 4,685,745 (EP-A- 0 189 076) discloses an electronic braking system wherein signals representative of the braking force values at different vehicle wheels across an axle are compared in an electronic controller to generate a regulation control signal which is used to control pressure regulating valves to reduce braking imbalance across the axle. The electronic controller can be arranged to update the braking value correction on the basis of braking values fed to it during or after the application of the vehicle brakes.

SUMMARY OF THE INVENTION

An object of the present invention is to provide means in an electronic braking system (EBS) for correcting brake force imbalance which may result from any of the possible causes mentioned above.

In accordance with a first aspect of the present invention, there is provided an electronic braking system having means for recognising differential braking across an axle and providing an adaptive capability whereby a braking controller is able to determine a value of the braking imbalance using a learning process and correct on the basis of this by introducing differential pressure adjustments such as to increase braking at the wheel with the lower brake output and/or reduce braking at the wheel with the higher brake output, the learning process being completed over selected parts of several vehicle stops and being repeated continuously, the means of assessment of the level of differential braking is provided by measurement of the differential distance travelled during braking, by the respective wheels on an axle per pre-set unit of distance so travelled.

Advantageously, the system has means for averaging the recorded braking imbalance over said several vehicle stops and storing same for use as a diagnostic output.

Advantageously, differences in rolling radii are assessed during the periods of running between vehicle stops to arrive at a background distance difference signal by accumulation over a pre-set unit of distance travelled under specially selected non-braking conditions, stored for use as a correction figure and subtracted from the braking differentials obtained.

In some situations where the detected background differential is high, this causes the differential braking control learning process to be suspended and provides a driver warning since the condition is most likely to result from serious tire pressure error.

In some embodiments, wheel speed differences can be accumulated from measurements made at regular intervals and there is accompanying simultaneous accumulation of total wheel speed pulses until a predetermined count of these has been made at which point the result of the differential distance accumulation is stored and a new count and . . . accumulation process is shortly thereafter commenced whilst the stored figure is used as the imbalance measurement until a new measurement is completed.

When multiple axles are being controlled, a single set of band and background counters can be used with pulse counters providing control signals for all equivalent axle accumulator sets.

The stored measurement can be used to derive a proportional differential braking correction figure arranged so that this figure builds up slowly over several accumulation periods until balance is achieved, at which point the measurement become sensibly zero whereby the built-up correction provides an indication of the level of brake imbalance for diagnostic purposes or, in the event of a serious imbalance, to give a driver warning. The differential braking correction is preferably made to be proportional to the demand signal.

In some embodiments, a means can be provided by which it is recognised that the imbalance in braking across an axle may not be constant at different demand levels, by operating multiple assessments, each corresponding to a particular band of demand, and wherein there is included for each band individual wheel pulse counters and associated wheel distance difference accumulators, with the appropriate equipment pair being selected by measurement of the braking demand signal level.

Advantageously, separate differential output stores are provided for each band and are selected by the demand level detector which receives the EBS brake demand signal.

Access to the multiple band data acquisition accumulators and pulse counters can be switched sequentially as dictated by variations in the braking demand level characterised by the ability for more than one band equipment to be supplied with data in certain stops which are subject to significant demand changes.

Advantageously, the data accumulation process is arranged to be suspended during periods of continually changing demand, though the differential pressure correction levels are maintained based upon previously stored assessment data.

BRIEF DESCRIPTION OF THE DRAWING

The invention is described further hereinafter, by way of example only, with reference to the accompanying drawings, in which.

DISCUSSION OF THE PREFERRED EMBODIMENTS

Imbalance correction in a vehicle braking system requires two basic system elements, namely a means of braking imbalance measurement and a control mechanism organised so as to adjust braking pressures differentially until the braking forces eventually become equal.

Conventional braking systems have no means of imbalance detection other than driver perception which is mainly derived from the steering axle where steering pull may be noticeable when braking imbalance becomes serious. On non-steering axles, imbalance is undetectable by the driver except in the non-equal lining wear which can only be assessed, before a full wear out condition is reached, by inspection of the brakes themselves. Lining wear measurement systems can improve this situation by displaying electrically the wear condition in the cab, or, the measurement can be used as in our earlier EP0386952 to modify the braking pressures individually across an axle so as to force an equal wear condition to exist. Wear equalisation can, however, actually develop braking imbalance across an axle and is therefore only used at low decelerations.

Figure 1:
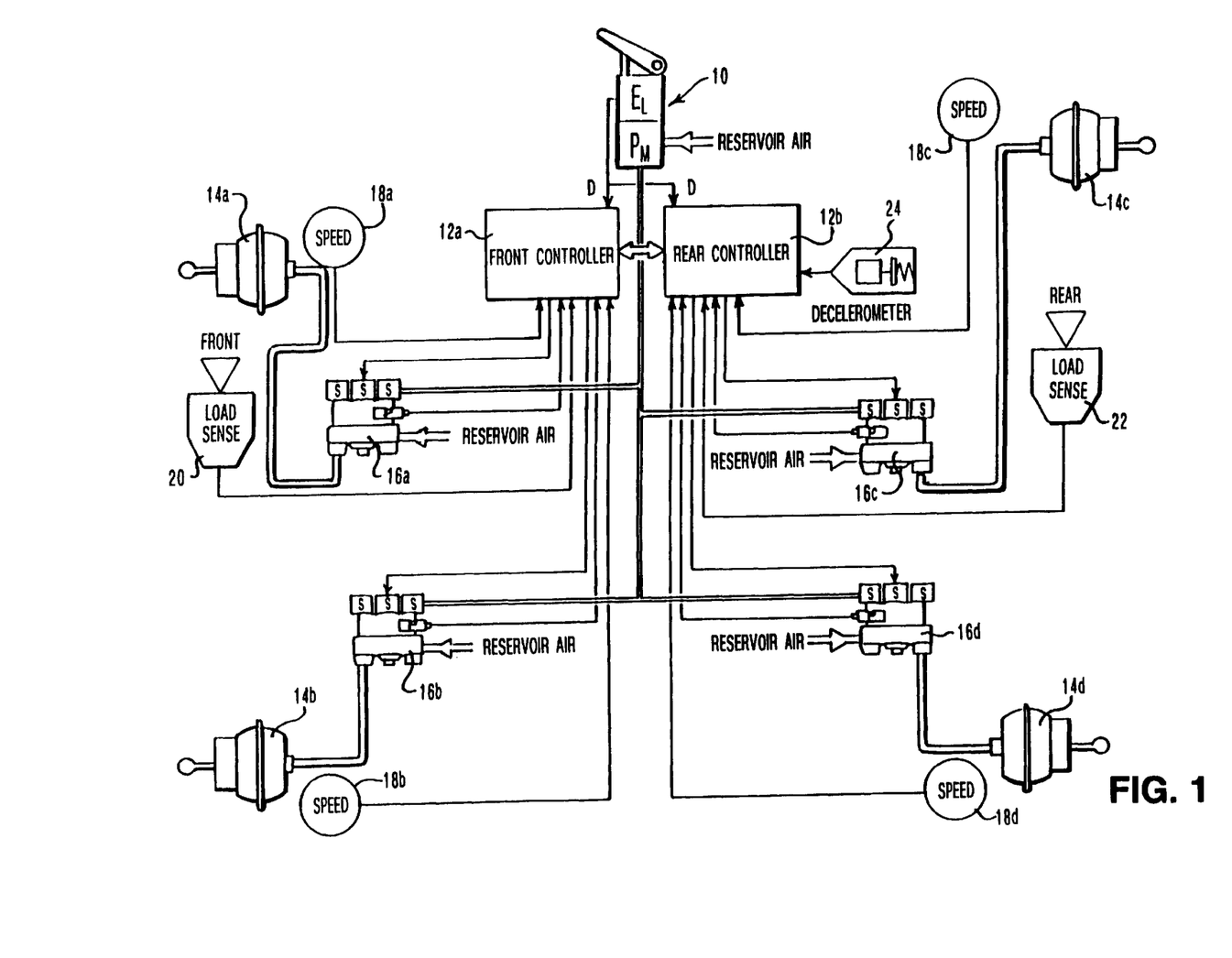
FIG. 1 is a diagrammatic representation of a braking system to which the present invention is applicable.

Reference is now made to FIG. 1 which illustrates the basic structure and operation of an electronically controlled vehicle braking system to which the present invention is applicable. The system of FIG. 1 comprises a brake pedal unit 10 which generates an electrical signal D representative of the driver's braking demand. The signal D is passed to front and rear electronic controllers 12a, 12b for controlling front (14a,14b) and rear (14c,14d) brake actuators respectively, via electro-pneumatic relay valves 16a,16b, 16c,16d in dependence upon the demand signal D. The front controller 12a receives signals from front wheel speed sensors 18a,18b and, a front axle load sensor 20. Likewise, the rear controller 12b receives signals from rear wheel speed sensors 18c,18d and a rear axle load sensor 22. The controllers 12a, 12b also receives a signal from a decelerometer 24 representative of the overall vehicle deceleration, but in some embodiments this can be replaced by a differentiator operating on the vehicle speed reference signal developed from wheel speed measurements.

In an electronic braking system such as that shown in FIG. 1 braking imbalance can be corrected electronically if it can be measured. When a wheel brake is applied, the resulting braking force generated causes the tire to "slip" with respect to the road surface—i.e. the peripheral tire velocity is less than the velocity of the vehicle travelling over the ground. The magnitude of this wheel speed reduction varies in accordance with the level of braking force applied and therefore if accurate values of wheel speed across an axle can be measured or inferred, the actual differential in applied braking force can be obtained. Since a tire which is being subjected to more applied braking force causes the wheel to rotate more slowly than a tire carrying a lower level of braking, comparisons of the respective values dependent upon the wheel speed, such as the number of wheel revolutions or, preferably, distance travelled by the wheel, during braking, can reveal any differences in the braking force applied to said wheels. All electronic braking systems have provisions for wheel speed measurements and in a well balanced braking system the wheel speeds on an axle should remain equal at all times during straight line braking so that both distances travelled are in agreement at the end of an assessment period. In a system with unbalanced braking, the wheel speeds may not remain equal throughout the stop but the likely speed differences are so small as to require special techniques for measurement.

The evolved standard for the measurement of commercial vehicle wheel speeds is to generate at suitable wheel mounted sensors such as the sensors 18a to 18d shown in FIG. 1, 100 pulses per revolution and these are converted for each wheel, into separate digital speed numbers on a 10–20 ms cycle, with the conversion process chosen so as to give good resolution. For the present purposes, the first measuring system embodiment in accordance with the present invention shown in FIG. 3 in diagrammatic form, accepts these wheel speed measurements W1 and W2 in a subtractor 30 and forms at each developed sample, given certain conditions, a wheel speed "difference" signal $\Delta W$ between the left and right hand wheels on the axle. These "difference" signals $\Delta W$ are normally so small as to be lost in the variations which are caused by operational disturbances, such as those resulting from suspension movements responding to road surface irregularities. However, accumulation of these speed differences over many cycles of measurement will effectively remove the noise and present a detectable wheel speed difference integral.

Figures 3, 4:
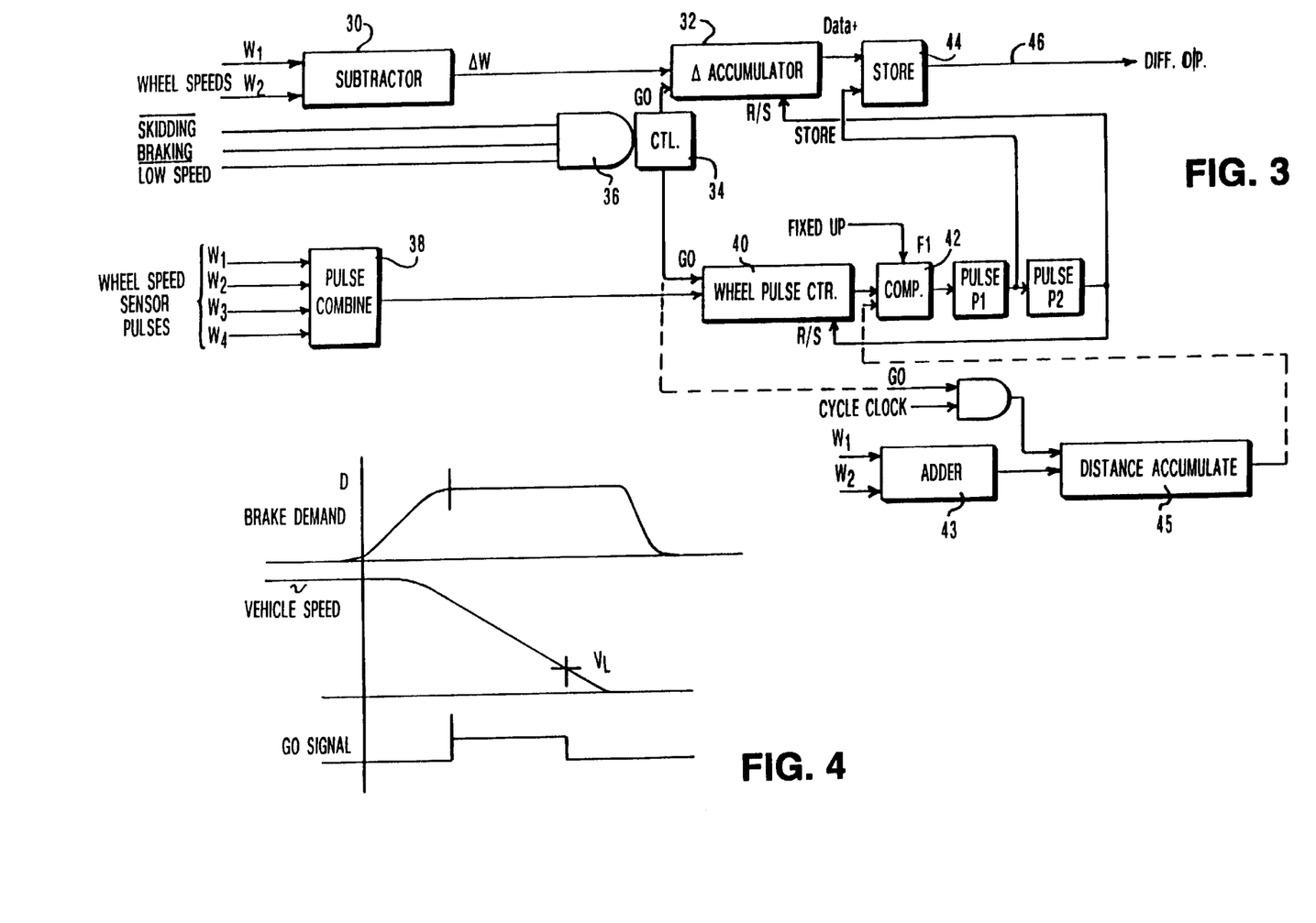
FIG. 3 is a diagrammatic representation of one embodiment of a differential braking control in accordance with the present invention.
FIG. 4 shows various operational characteristics of the system of FIG. 2.

Thus, in the system of FIG. 3, the difference signals $\Delta W$ are applied to an accumulator 32 where speed signal integration is arranged to be made during braking or non-braking as selected by a further control input GO provided by a control unit 34. The control unit 34 receives input signals indicative of a "braking" signal being present, the wheel speeds all being above a preset threshold and no skidding taking place, the latter signals being received by the control unit 34 via an AND gate 36. By this means, for measurement required during braking only, the accumulator 32 is only allowed by the control unit 34 to accept new wheel speed differences $\Delta W$ when the "Braking" signal is present AND the wheel speeds are all above the pre-set threshold AND no skidding is being detected by the anti-lock (ABS) system (not shown in detail). This may very easily require the accumulation period to be made over more than one stop and indeed over several stops if these are from low speeds.

Along with the accumulation to form wheel distance travelled differentials, a parallel accumulation of wheel speed pulses is made and this may be conducted using two options:

a) Using the pulses from the two wheel speed sensors on a axle; and b) Using pulses from all wheel speed sensors on the vehicle.

FIG. 3 shows the preferred implementation which uses option (b) accepting pulses from all wheels on the vehicle. For this purpose, the wheel speed sensor pulses W1,W2, W3,W4 from all four wheels (in the case of a four wheeled vehicle) are applied to a pulse combining element 38 whose output is coupled to a wheel pulse counter 40 when the combined pulse count is accumulated. The accumulation period is set by the wheel pulse counter 40 and is of variable duration depending upon wheel speeds within each stop. At a pre-set count at the counter 40 set by a fixed input F1 to a following comparator 42, an equality signal is generated, the leading edge of which produces a first pulse P1 which causes the contents of the Δ accumulator 32 to be transferred to an output store 44, adding to any previous data in that store. The data in the store 44 provides a differential braking measurement value on an output line 46 for the axle being measured which is presented to the EBS pressure control systems as described hereinafter. The trailing edge of pulse P1 generates a second short pulse P2 which is used to reset both the Δ accumulator 32 and the wheel pulse counter 40. The assessment routine is repeated during subsequent stops and the output store 44 is updated as each measurement is completed, thereby forming an adaptive system which learns the differential pressure correction required to adjust braking into balance.

In some systems it is not easy to measure the distance base by counting combined wheel speed pulses and an alternative is provided by integration of wheel speed measurements where these are produced on a regular fixed time cycle. This is shown in FIG. 3 in dashed lines where the wheel speeds W1 and W2 are added together in an adder 43 and at every acquisition cycle are added into a distance accumulator 45 in the same way as differential speeds are accumulated, except that the sum requires a much larger accumulator. This accumulator 45, which takes the place of the wheel pulse counter 40 in the alternative arrangement, is thereby updated on every measurement cycle.

Figure 2:
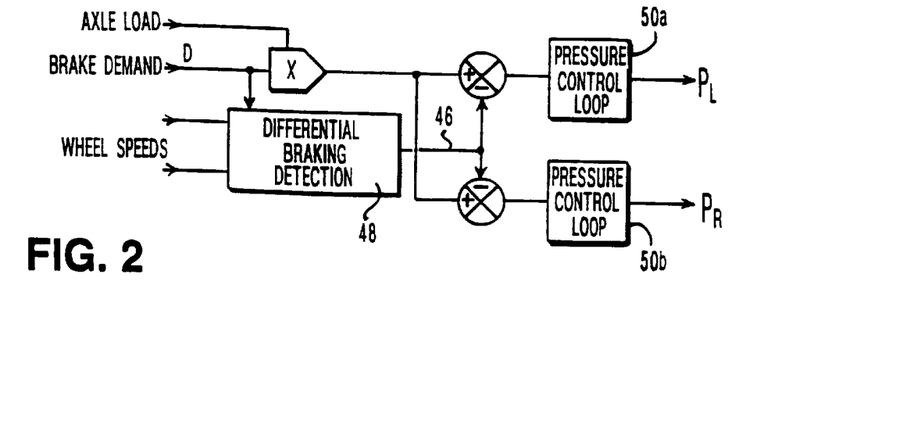
FIG. 2 shows a detail of the braking system of FIG. 1 modified in accordance with one preferred aspect of the present invention.

The accumulated brake force differential measurement established by the system of FIG. 3 is used to form a pressure correction which is arranged to be added to the under-braking wheel and to be subtracted from the over-braking wheel as shown in FIG. 2. Referring to the latter figure, the differential braking detection system of FIG. 3 is identified by box 48 the output line 46 being shown to be connected to the two pressure control loops 50a,50b associated with the supply of actuating pressures PL and PR to the left and right hand brake actuators respectively on a given axle. The accumulated measurement is multiplied by the brake demand D and scaled by a pre-set figure before being used to modify the pressure demands produced by the EBS axle control system. In an alternative arrangement, the differential signal may be applied only to the underbraking wheel as a means of correcting braking deficiencies.

The basic system of FIG. 3 provides a single imbalance coefficient at the output store 44 which is then used to provide differential pressure correction which is proportional to braking demand as in FIG. 2. However, in some circumstances, the correction required is not proportional to the demand D so that separate correction levels are assessed at different vehicle decelerations. These levels in an EBS system can be assumed, with reasonable accuracy, from the braking demand levels if the system has adaptive features governing overall braking.

Figure 5:
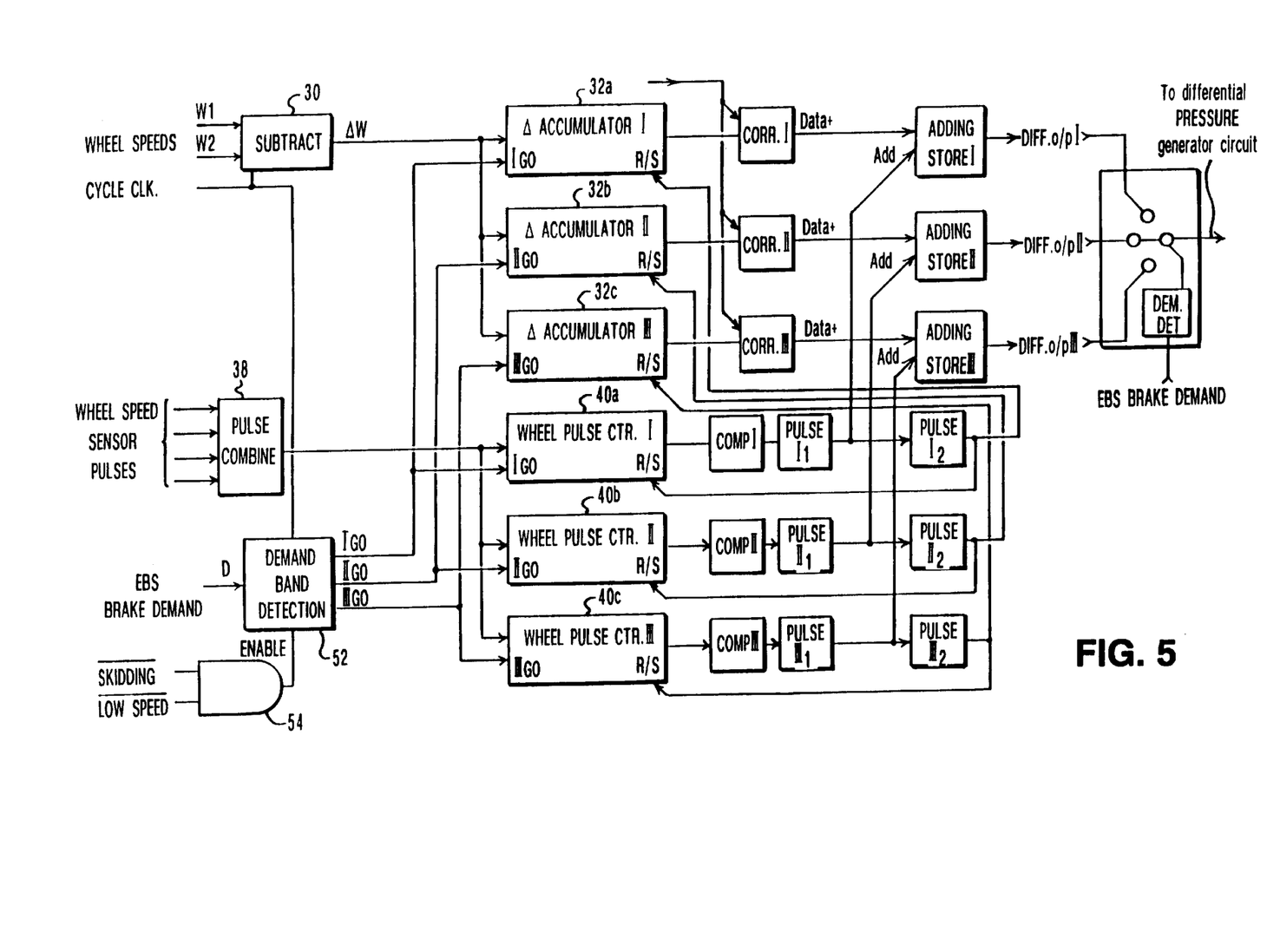
FIG. 5 is a diagrammatic representation of a second embodiment of a differential braking control in accordance with the present invention.

Referring now to FIG. 5, where equivalent components are given the same reference numerals as in FIG. 3, there is shown a second embodiment in accordance with this invention which essentially comprises three measurement systems operating at different demand levels set up as Bands 1, 11 & 111. The brake demand D is measured in a band detection circuit 52, producing one of three band signals depending on the band level. This signal is the enable signal GO to the appropriate Band accumulator 32a,32b,32c and wheel pulse counter 40a,40b,40c. The master GO signal is only generated during the braking period above a pre-set minimum speed provided that no skidding is taking place at any wheel on the vehicle, as determined by an AND gate 54. The demand signal is modified in this detector so as to delay the start of any GO signal until the demand signal (see FIG. 3) has stopped increasing. This GO signal (GO 1, GO 11 or GO 111) is terminated at some low speed $V_2$, typically 8–10 km/h, where wheel speed sensor signals may become unreliable or at any higher speed should the brake pedal be released. The GO signal selects an appropriate Δ accumulator 32 and wheel pulse counter 40 and controls the application of input data to these elements during the stop. Thus, three groups of associated data are in the course of being gathered at any time and, on a series of vehicle stops, braking demand levels will determine how input data is routed into this expanded measuring system. When any wheel pulse counter 40 reaches the common threshold set into all comparators, the corresponding pulse 1, pulse 2 sequence is initiated whereby the appropriate accumulator 32 content is added to the associated store 40 and that accumulator and pulse counter are cleared to begin the next data gathering session. In operation, the EBS system selects at each vehicle stop the appropriate differential measurement set by the level of demand being established by the braking pedal to generate the level of pressure differential to be applied during the stop.

If the braking demand level changes substantially during a stop, the band detection circuit inhibits the GO signal and terminates the pulse counting and differential accumulation process. If the demand stabilises at a different level, a different GO signal is produced and different accumulator and pulse counters are selectively enabled. Thus, in a particular stop, data may be gathered sequentially for more than one channel, based upon the nature and variation of the braking demand signal sensed.

Figures 6, 7:
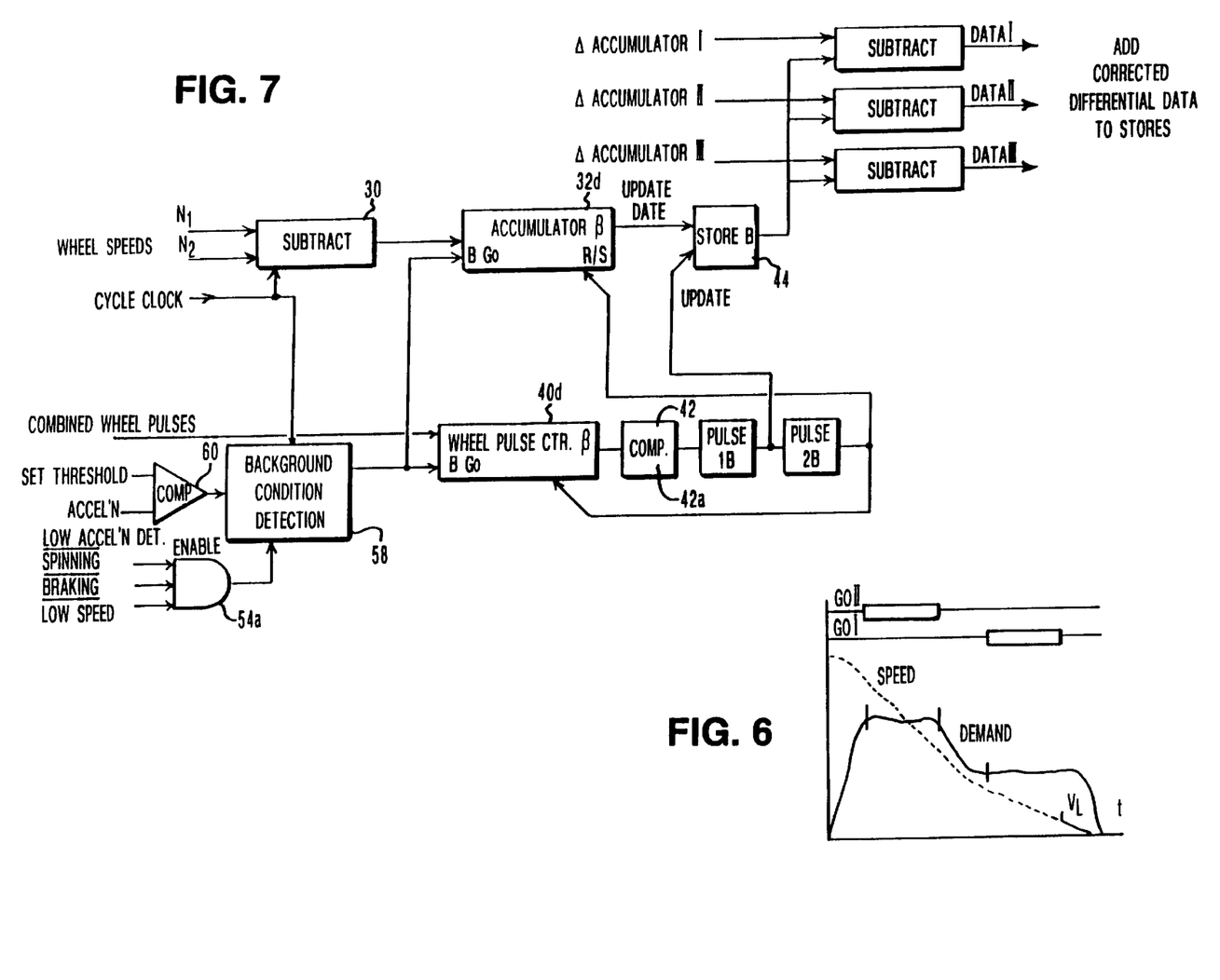
FIG. 6 illustrates the operation of the apparatus of FIG. 4.
FIG. 7 is a diagrammatic representation of a third embodiment of a differential braking control in accordance with the present invention.

An example of this operation is shown in FIG. 6 where demand starts high and in mid-stop, where perhaps the urgency in braking has fallen, the demand falls to a lower but steady level. Should the level keep changing, the band detection circuit recognising the continuous variation does not issue any further GO signals on this particular stop.

The aforegoing description of a 3 band system is given by way of example only and in some applications the principle can be extended to more than 3 bands, which are not necessarily equally spaced.

Because the learning process is based on the accumulation of small distances differences, erroneous results would be produced if the vehicle wheels have differences in rolling radii. This may result from tire differences or tire pressure differences and should be taken into account for example as shown in FIG. 7. Here there is provided a background differential speed detection circuit/software arrangements 58 in which wheel speed differences are accumulated in an accumulator 32d over a large number of wheel speed pulses as set by a wheel pulse counter 40d and the associated comparator 42a which establishes a fixed distance of non-braking for assessment of background distance travelled imbalance.

This assessment is subject to inhibit conditions of low speed and wheel spin during acceleration determined by corresponding test signals applied to AND gate 54a and the process is discontinued if acceleration exceeds a pre-set low level determined by a comparator 60 receiving a signal representative of the actual acceleration value and a set threshold. The assessment is thus likely to be continuous in some instances and made up of several sections in other cases but since the B GO signal from the background condition detection circuit 58 affects both the difference accumulator 32$d$ and the wheel pulse counter 40$d$, errors are not significant. Each assessment period ends when the wheel pulse counter 40$d$ reaches the threshold of the pre-set comparator 42 and the change of the comparator signal generates the two following pulses 1B and 2B. Pulse 1B acts to transfer the accumulated differential distance data from the accumulator 32$d$ to the overwrite store 44 where it will be used to correct subsequent readings of all the braking accumulators and Pulse 2B resets both the wheel pulse counter and the differential accumulator. After the short pulse 2B, the counter and accumulator are able to commence gathering data for the next cycle. The stored background distance differential is assessed as described hereinbefore over a pre-set distance which is maintained at the same distance as the assessment is made during braking. The correction for any background distance differential during non-braking is made by simply subtracting the background figure from each new braking differential accumulator reading before it is added to the appropriate differential store. The output correction is updated by adding the accumulated results adjusted for background levels, to the appropriate adding store to generate a differential output to be selected on each stop, in which the EBS demand is appropriate, for derivation of a pressure differential signal designed to give braking balance. In such a balanced condition, the differential outputs provide a good measure of the band imbalance and can be provided as a diagnostic message or, if very serious, can be used to generate a driver warning signal.

The system gain is controlled in the level of pressure being generated by a given level of differential output in any particular band of demand input and this generation process is adjusted, independently in each band so that stable operation of the correction system is produced.

Figure 8:
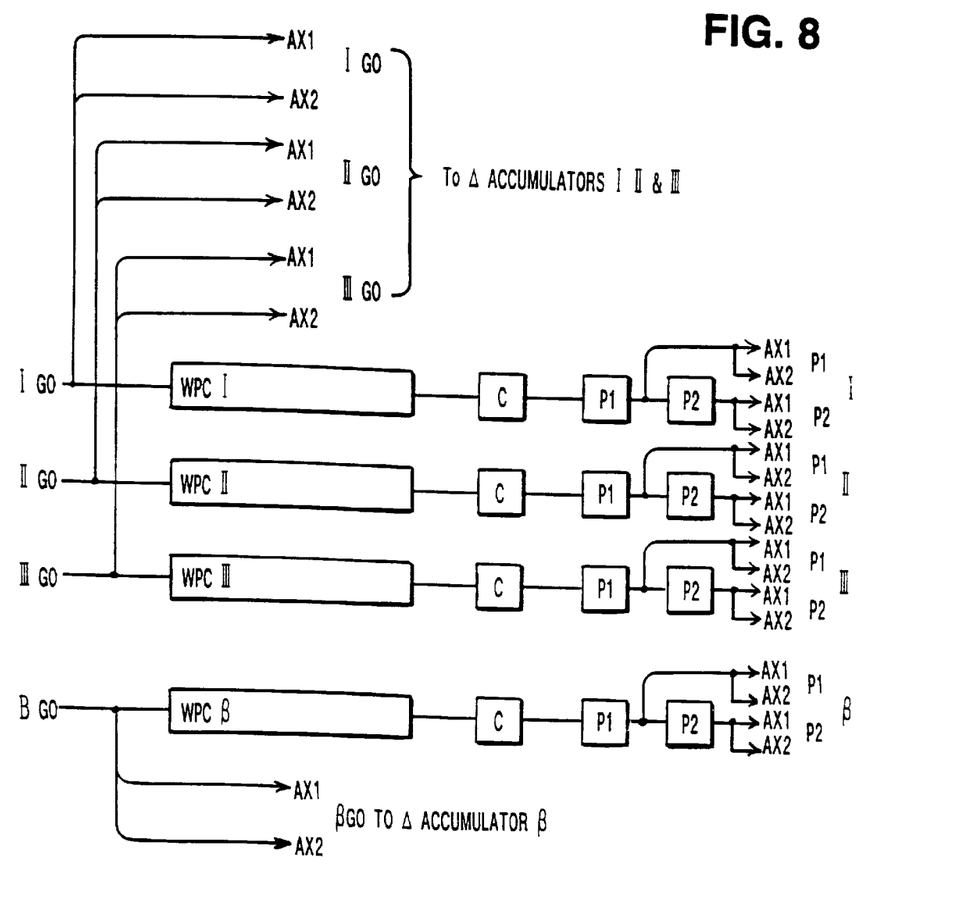
FIG. 8 illustrates an embodiment in accordance with the present invention which is adapted to be applied to more than one axle of a vehicle.

In the case that differential braking control is applied to more than one axle on a vehicle, the assessment channels corresponding to the different bands of demand are repeated for each axle but the corresponding pulse counting channels for each band and the background assessment channel are not repeated as band and background GO signals are common to all axles since they are derived from vehicle condition signals. This is shown in FIG. 8 for two differentially controlled axles on a vehicle, where only one set of band and background GO signals are provided and a common set of wheel pulse counters provide the P1, P2 control signals to the accumulators on both axles, thus saving some of the provision requirements whether this is engineered in circuit hardware as shown or in the equivalent software for a digital computer control solution.

What is claimed is:

1. An electronic braking system having means for recognising differential braking across an axle and providing an adaptive capability whereby a braking controller is able to determine a value of the braking imbalance using a learning process and correct on the basis of this by introducing differential pressure adjustments, the learning process being completed over selected parts of several vehicle stops and being repeated continuously, characterized in that the means of assessment of the level of differential braking is provided by measurement of a differential distance travelled during braking by the respective wheels on an axle per pre-set unit of distance so travelled.

2. An electronic braking system as claimed in claim 1, having means for averaging a recorded braking imbalance over said several vehicle stops and storing same for use as a diagnostic output.

3. An electronic braking system as claimed in claim 1 wherein differences in rolling radii are arranged to be assessed during the periods of running between vehicle stops to arrive at a background differential distance signal which is accumulated over a pre-set unit of distance travelled under acceptable non-braking conditions, stored for use as a correction figure and subtracted from the braking differentials obtained.

4. An electronic braking system as claimed in claim 3, having means whereby, when the detected background differential is detected to be above a predetermined level, the differential braking control learning process is suspended and a driver warning is generated.

5. An electronic braking system as claimed in claim 1 having means whereby distance travelled differences are accumulated from measurements made at regular intervals and there is accompanying simultaneous accumulation of total wheel speed pulses until a predetermined count of these has been made, at which point the result of the accumulated distance travelled differences is stored and a new count and accumulation process is shortly thereafter commenced while the stored figure is used as the imbalance measurement until a new measurement is completed.

6. An electronic braking system as claimed in claim 1 wherein, when multiple axles are being controlled, a single set of band and background counters are used, with pulse counters providing control signals for all equivalent axle accumulator sets.

7. An electronic braking system as claimed in claim 1 wherein a stored measurement is used to derive a proportional differential braking correction figure arranged so that this figure builds up slowly until balance is achieved, at which point the stored measurement becomes sensibly zero whereby the built-up correction provides an indication of the level of brake imbalance for diagnostic purposes or, in the event of a serious imbalance, to give a driver warning.

8. An electronic braking system as claimed in claim 7, having means whereby the differential braking correction is made to be proportional to a demand signal.

9. An electronic braking system as claimed in claim 1 having a means by which, by operating multiple assessments, each corresponding to a particular band of driver demand, it is recognised that the imbalance in braking across an axle may not be constant at different driver demand levels, and wherein there is included for each band individual wheel pulse counters and associated wheel distance difference accumulators, with an appropriate equipment pair being selected by measurement of an actual braking demand signal level.

10. An electronic braking system as claimed in claim 9, wherein separate differential output stores are provided for each band and are selected by the demand level detector which receives the EBS brake demand signal generated by the driver.

11. An electronic braking system as claimed in claim 9, wherein access to multiple band data acquisition accumulators and pulse counters can be switched sequentially as dictated by variations in the braking demand level characterised by the ability for more than one band equipment to be supplied with data in certain stops which are subject to significant demand changes.

12. An electronic braking system as claimed in claim 11, wherein the data accumulation process is arranged to be suspended during periods of continually changing driver braking demand, though the differential pressure correction levels are maintained based upon previously stored assessment data.

13. An electronic braking system as claimed in claim 2, wherein differences in rolling radii are arranged to be assessed during the periods of running between vehicle stops to arrive at a background differential distance signal which is accumulated over a pre-set unit of distance traveled under acceptable non-braking conditions, stored for use as a correction figure and subtracted from the braking differentials obtained.

14. An electronic braking system as claimed in claim 2, having means whereby distance traveled differences are accumulated from measurements made at regular intervals and there is accompanying simultaneous accumulation of total wheel speed pulses until a predetermined count of these has been made, at which point the result of the differential distance accumulation is stored and a new count and accumulation process is shortly thereafter commenced whilst the stored figure is used as the imbalance measurement until a new measurement is completed.

15. An electronic braking system as claimed in claim 3, having means whereby distance traveled differences are accumulated from measurements made at regular intervals and there is accompanying simultaneous accumulation of total wheel speed pulses until a predetermined count of these has been made, at which point the result of the differential distance accumulation is stored and a new count and accumulation process is shortly thereafter commenced whilst the stored figure is used as the imbalance measurement until a new measurement is completed.

16. An electronic braking system as claimed in claim 4, having means whereby distance traveled differences are accumulated from measurements made at regular intervals and there is accompanying simultaneous accumulation of total wheel speed pulses until a predetermined count of these has been made, at which point the result of the differential distance accumulation is stored and a new count and accumulation process is shortly thereafter commenced whilst the stored figure is used as the imbalance measurement until a new measurement is completed.

17. An electronic braking system as claimed in claim 2 wherein, when multiple axles are being controlled, a single set of band and background counters are used, with pulse counters providing control signals for all equivalent axle accumulator sets.

18. An electronic braking system as claimed in claim 3 wherein, when multiple axles are being controlled, a single set of band and background counters are used, with pulse counters providing control signals for all equivalent axle accumulator sets.

19. An electronic braking system as claimed in claim 4 wherein, when multiple axles are being controlled, a single set of band and background counters are used, with pulse counters providing control signals for all equivalent axle accumulator sets.

20. An electronic braking system as claimed in claim 5 wherein, when multiple axles are being controlled, a single set of band and background counters are used, with pulse counters providing control signals for all equivalent axle accumulator sets.

* * * * *